US012664805B2

(12) United States Patent
Meyer et al.

(10) Patent No.: US 12,664,805 B2
(45) Date of Patent: Jun. 23, 2026

(54) WEAK-TO-STRONG ANNOTATION ALIGNMENT FOR TABULAR DATA

(71) Applicant: SAP SE, Walldorf (DE)

(72) Inventors: Christoph Meyer, Berlin (DE); Annie Lim, Paris (FR)

(73) Assignee: SAP SE, Walldorf (DE)

( * ) Notice: Subject to any disclaimer, the term of this patent is extended or adjusted under 35 U.S.C. 154(b) by 224 days.

(21) Appl. No.: 18/622,353

(22) Filed: Mar. 29, 2024

(65) Prior Publication Data

US 2025/0308273 A1     Oct. 2, 2025

(51) Int. Cl.
*G06V 30/19*     (2022.01)
*G06V 30/14*     (2022.01)
*G06V 30/412*     (2022.01)

(52) U.S. Cl.
CPC .... *G06V 30/19013* (2022.01); *G06V 30/1448* (2022.01); *G06V 30/19147* (2022.01); *G06V 30/412* (2022.01)

(58) Field of Classification Search
CPC ......... G06V 30/19013; G06V 30/1448; G06V 30/19147; G06V 30/412
See application file for complete search history.

(56) References Cited

U.S. PATENT DOCUMENTS

| | | | | |
|---|---|---|---|---|
| 11,893,012 | B1 * | 2/2024 | Appalaraju ............. | G06N 3/08 |
| 12,524,456 | B2 * | 1/2026 | Ferreira ................ | G06F 16/383 |
| 12,525,048 | B2 * | 1/2026 | Sureka ................. | G06V 30/416 |
| 2019/0130512 | A1 * | 5/2019 | Kuhn ..................... | H04L 67/00 |

| | | | | |
|---|---|---|---|---|
| 2021/0004584 | A1 * | 1/2021 | Bildner ................... | G06N 3/08 |
| 2021/0200937 | A1 * | 7/2021 | Wheaton .............. | G06F 40/284 |
| 2021/0201112 | A1 * | 7/2021 | Gauthier Melançon ..................... G06V 30/19173 |
| 2023/0260306 | A1 * | 8/2023 | Yu ........................ G06V 30/414 382/181 |
| 2023/0368553 | A1 * | 11/2023 | Jha .......................... | G06F 17/14 |
| 2024/0152510 | A1 * | 5/2024 | Appalaraju ............. | G06F 18/22 |
| 2024/0221413 | A1 * | 7/2024 | Wells ..................... | G06F 16/53 |
| 2024/0404311 | A1 * | 12/2024 | Shi ....................... | G06V 30/412 |
| 2025/0005007 | A1 * | 1/2025 | Hariharan .............. | G06F 16/22 |
| 2025/0005048 | A1 * | 1/2025 | Java ...................... | G06F 16/43 |
| 2025/0054325 | A1 | 2/2025 | Yu et al. | |

(Continued)

OTHER PUBLICATIONS

U.S. Appl. No. 18/231,652, filed Aug. 8, 2023, Yu et al.
U.S. Appl. No. 18/375,952, filed Oct. 2, 2023, Meyer et al.

*Primary Examiner* — Santiago Garcia

(74) *Attorney, Agent, or Firm* — Klarquist Sparkman, LLP

(57)     ABSTRACT

Systems and processes for aligning weakly-annotated tabular data to recognized characters in a document are provided. Data table annotations are grouped by column and value to produce a plurality of annotation groups. Character recognition tokens are received, and a search algorithm is performed to align the annotation groups to the tokens in a stepwise manner. A base column is designated, after which the search algorithm is performed on the base column annotation groups and the results are used to determine a vertical range of the data table. The search algorithm is then run for the other columns of the data table with the results being limited based on the vertical range. At each step, the annotations in an annotation groups are each aligned to one or more of the tokens. A bounding box is generated for each annotation in the data table and output to a target application.

20 Claims, 9 Drawing Sheets

(56)                   References Cited

U.S. PATENT DOCUMENTS

| | | | |
|---|---|---|---|
| 2025/0111138 A1* | 4/2025 | McConathy | G06V 30/18105 |
| 2025/0111687 A1* | 4/2025 | Meyer | G06V 30/146 |
| 2025/0209842 A1* | 6/2025 | Du | G06V 30/414 |
| 2025/0232604 A1* | 7/2025 | Kwapong | G06V 30/414 |
| 2025/0384708 A1* | 12/2025 | Ramaswamy | G06V 30/412 |
| 2025/0390673 A1* | 12/2025 | Modani | G06F 40/194 |
| 2026/0004060 A1* | 1/2026 | McConathy | G06F 40/186 |
| 2026/0024369 A1* | 1/2026 | Kolavennu | G06V 30/42 |

* cited by examiner

Figure 3:
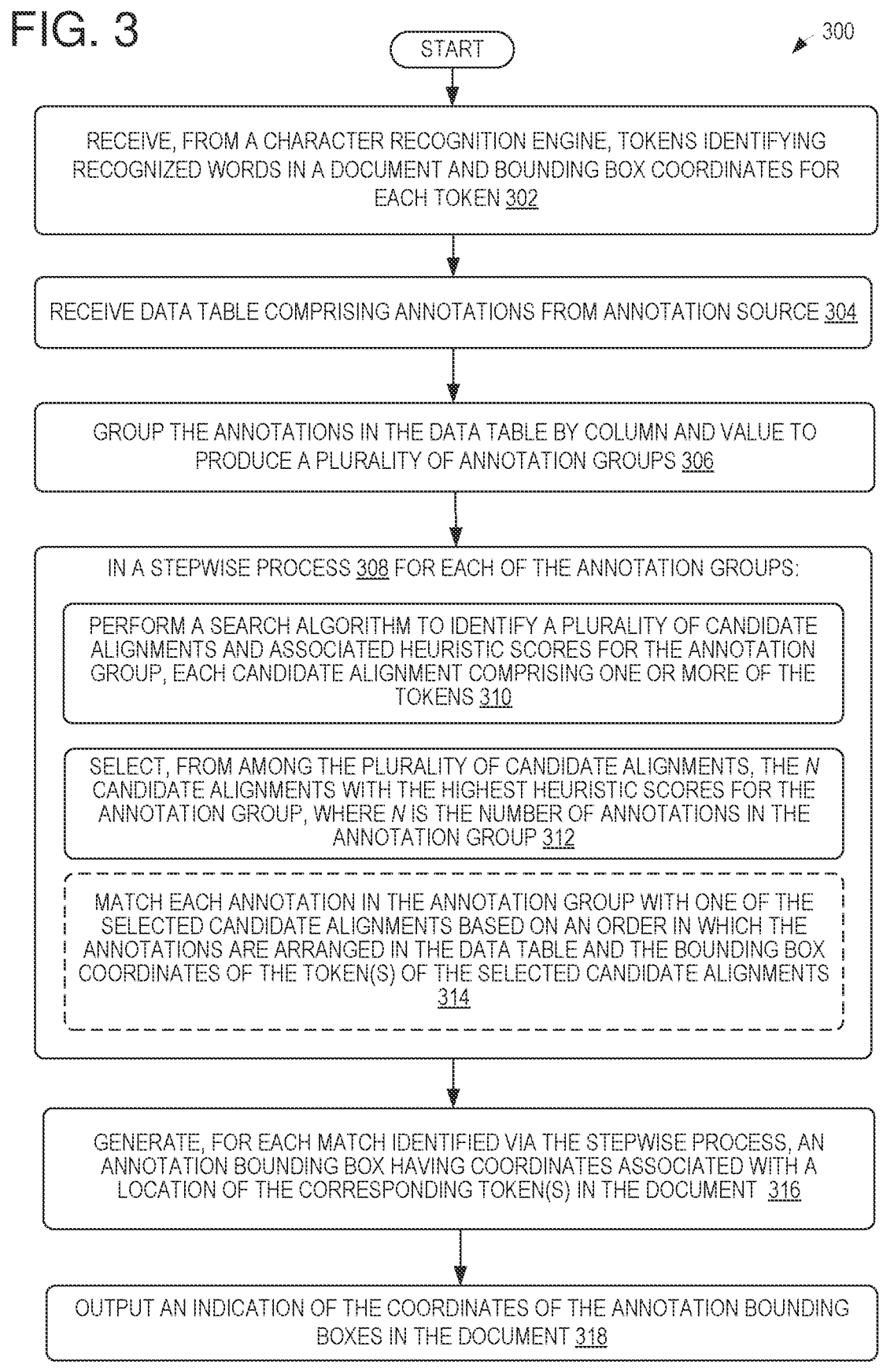

START

RECEIVE, FROM A CHARACTER RECOGNITION ENGINE, TOKENS IDENTIFYING RECOGNIZED WORDS IN A DOCUMENT AND BOUNDING BOX COORDINATES FOR EACH TOKEN 302

RECEIVE DATA TABLE COMPRISING ANNOTATIONS FROM ANNOTATION SOURCE 304

GROUP THE ANNOTATIONS IN THE DATA TABLE BY COLUMN AND VALUE TO PRODUCE A PLURALITY OF ANNOTATION GROUPS 306

IN A STEPWISE PROCESS 308 FOR EACH OF THE ANNOTATION GROUPS:

PERFORM A SEARCH ALGORITHM TO IDENTIFY A PLURALITY OF CANDIDATE ALIGNMENTS AND ASSOCIATED HEURISTIC SCORES FOR THE ANNOTATION GROUP, EACH CANDIDATE ALIGNMENT COMPRISING ONE OR MORE OF THE TOKENS 310

SELECT, FROM AMONG THE PLURALITY OF CANDIDATE ALIGNMENTS, THE $N$ CANDIDATE ALIGNMENTS WITH THE HIGHEST HEURISTIC SCORES FOR THE ANNOTATION GROUP, WHERE $N$ IS THE NUMBER OF ANNOTATIONS IN THE ANNOTATION GROUP 312

MATCH EACH ANNOTATION IN THE ANNOTATION GROUP WITH ONE OF THE SELECTED CANDIDATE ALIGNMENTS BASED ON AN ORDER IN WHICH THE ANNOTATIONS ARE ARRANGED IN THE DATA TABLE AND THE BOUNDING BOX COORDINATES OF THE TOKEN(S) OF THE SELECTED CANDIDATE ALIGNMENTS 314

GENERATE, FOR EACH MATCH IDENTIFIED VIA THE STEPWISE PROCESS, AN ANNOTATION BOUNDING BOX HAVING COORDINATES ASSOCIATED WITH A LOCATION OF THE CORRESPONDING TOKEN(S) IN THE DOCUMENT 316

OUTPUT AN INDICATION OF THE COORDINATES OF THE ANNOTATION BOUNDING BOXES IN THE DOCUMENT 318

Figure 6:
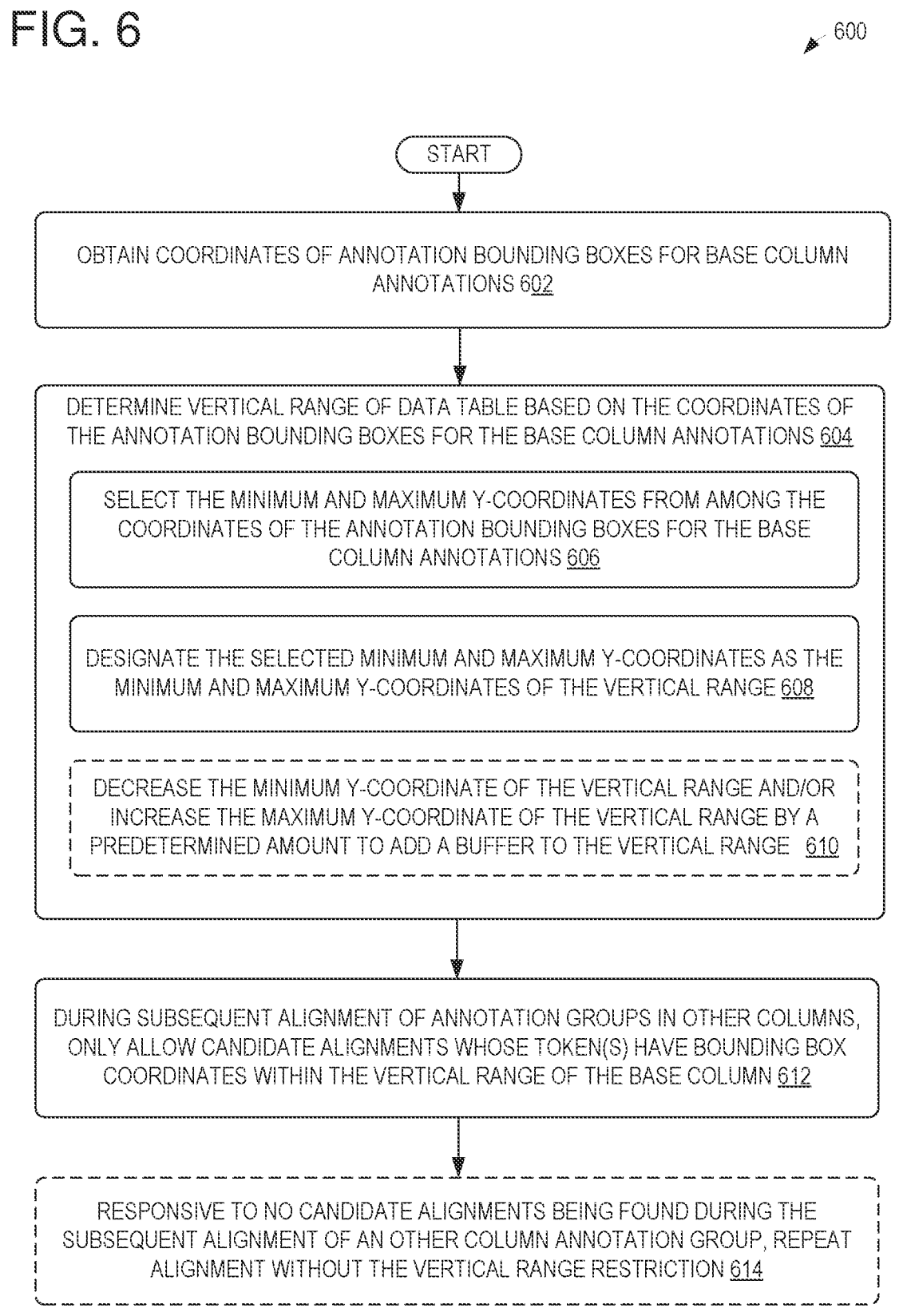

FIG. 6                                                                 600

```
                              ( START )
                                  │
                                  ▼
┌─────────────────────────────────────────────────────────────────────┐
│   OBTAIN COORDINATES OF ANNOTATION BOUNDING BOXES FOR BASE COLUMN     │
│                       ANNOTATIONS 602                                 │
└─────────────────────────────────────────────────────────────────────┘
                                  │
                                  ▼
┌─────────────────────────────────────────────────────────────────────┐
│  DETERMINE VERTICAL RANGE OF DATA TABLE BASED ON THE COORDINATES OF   │
│  THE ANNOTATION BOUNDING BOXES FOR THE BASE COLUMN ANNOTATIONS 604    │
│  ┌─────────────────────────────────────────────────────────────────┐ │
│  │   SELECT THE MINIMUM AND MAXIMUM Y-COORDINATES FROM AMONG THE    │ │
│  │   COORDINATES OF THE ANNOTATION BOUNDING BOXES FOR THE BASE      │ │
│  │                  COLUMN ANNOTATIONS 606                          │ │
│  └─────────────────────────────────────────────────────────────────┘ │
│  ┌─────────────────────────────────────────────────────────────────┐ │
│  │  DESIGNATE THE SELECTED MINIMUM AND MAXIMUM Y-COORDINATES AS THE │ │
│  │  MINIMUM AND MAXIMUM Y-COORDINATES OF THE VERTICAL RANGE 608     │ │
│  └─────────────────────────────────────────────────────────────────┘ │
│  ┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐ │
│  │  DECREASE THE MINIMUM Y-COORDINATE OF THE VERTICAL RANGE AND/OR  │ │
│  │   INCREASE THE MAXIMUM Y-COORDINATE OF THE VERTICAL RANGE BY A   │ │
│  │  PREDETERMINED AMOUNT TO ADD A BUFFER TO THE VERTICAL RANGE  610 │ │
│  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘ │
└─────────────────────────────────────────────────────────────────────┘
                                  │
                                  ▼
┌─────────────────────────────────────────────────────────────────────┐
│  DURING SUBSEQUENT ALIGNMENT OF ANNOTATION GROUPS IN OTHER COLUMNS,   │
│  ONLY ALLOW CANDIDATE ALIGNMENTS WHOSE TOKEN(S) HAVE BOUNDING BOX     │
│   COORDINATES WITHIN THE VERTICAL RANGE OF THE BASE COLUMN 612        │
└─────────────────────────────────────────────────────────────────────┘
                                  │
                                  ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│    RESPONSIVE TO NO CANDIDATE ALIGNMENTS BEING FOUND DURING THE       │
│  SUBSEQUENT ALIGNMENT OF AN OTHER COLUMN ANNOTATION GROUP, REPEAT     │
│     ALIGNMENT WITHOUT THE VERTICAL RANGE RESTRICTION 614              │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

STEP 4B: ALIGN 5TH ANNOTATION GROUP
{(QUANTITY, 4)}

STEP 4A: ALIGN 4TH ANNOTATION GROUP
{(QUANTITY, 1), (QUANTITY, 1)}

800

Computing Cloud
890

Software 880
for described
technologies

Computing Environment 810

820

822
Processing
Unit

824
Memory

Communication
Port(s)        870

Input Device(s)
850

Output Device(s)
860

Graphics or Co-processor
830

Storage
840

Software 880 for
described
technologies

FIG. 9
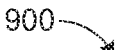
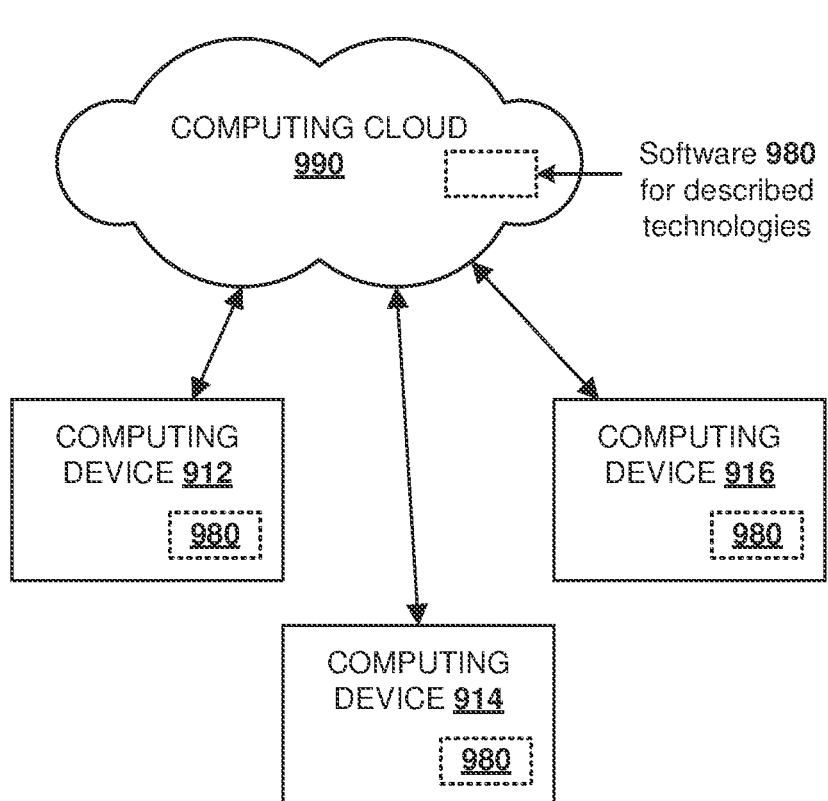

WEAK-TO-STRONG ANNOTATION ALIGNMENT FOR TABULAR DATA

BACKGROUND

Optical character recognition (OCR), intelligent character recognition (ICR), and/or other content extraction mechanisms can be performed on digital documents in order to generate machine-readable representations of the content in the documents that allow for further computer processing based on and/or using the extracted content. In some machine learning models for document information extraction tasks, training labels are used, which include both the content to be extracted (e.g., some invoice number) and a bounding box localizing it on the document. Such annotations are also referred to as strong annotations. The input for such models is typically constructed from the output of an OCR engine (individual OCR tokens), which is then aligned with the label information. Using the bounding boxes of the strong annotations, this alignment can be computed by using some measure of overlap between the bounding boxes of the OCR tokens and the bounding boxes of the strong annotations.

However, applications, such as the above-described models, that use strong annotation severely limit the amount of training data that is available. Typically, the strong annotations are created by human annotators who manually generate the bounding boxes for annotated content, which is both costly and time-consuming. Data without bounding boxes for the labels, referred to as weakly annotated data, on the other hand is available in much larger quantities as this data can be extracted from Enterprise Resource Planning (ERP) systems that store the information that was extracted from business documents (in most cases by humans). However, in these contexts, the weak annotations would not include bounding boxes, as they are not relevant for ERP.

Similar problems occur when generative artificial intelligence (AI) models such as Large Language Models (LLMs) or other Machine Learning Models (MLMs) are used to extract information from documents. An LLM typically only returns an extracted string of characters but not a bounding box for the string, as the LLM does not have access to the pixel coordinate information.

Existing technologies for generating bounding boxes using weak-to-strong algorithms suffer from errors when attempting to align tabular data. For example, such technologies tend to incorrectly select the same bounding box for all repeated values in a column rather than correctly assigning the bounding boxes to the different line items that contain the value. As another example, such technologies sometimes incorrectly map annotations within a data table to tokens outside of the data table (e.g., tokens in another part of the document). Accordingly, there remains a need for improved technologies to generate bounding boxes used for strong annotations of tabular data with reduced human interaction and resources relative to the typical strong annotation processes described above.

BRIEF DESCRIPTION OF THE DRAWINGS

FIG. 3 is a flow chart of an example method for aligning OCR tokens representing tabular data with weak annotations in accordance with examples of the present disclosure.

FIG. 6 is a flow chart of an example method for determining a vertical range of a data table based on base column annotation alignments in accordance with examples of the present disclosure.

FIG. 9 is a diagram schematically depicting computing devices operating in conjunction with a computing cloud for implementation of disclosed technologies.

DETAILED DESCRIPTION

Introduction and Overview

As described above, optical character recognition (OCR) may be used to extract content from digital documents, such as scans of physical documents, digital images of textual content, and/or other documents that include text (as used herein, the term "text" may include letters, numbers, and/or other characters). However, such recognition algorithms typically do not account for tabular data within a document, and simply return recognized characters in a line-by-line sequence. While some recognition algorithms may provide a rudimentary interpretation of the structure of a data table (e.g., by adding characters separating the contents of different columns and rows of the data table), it can still be difficult to correctly generate bounding boxes around annotations in data tables. As such, for documents containing tabular data, conversion of weak annotations to strong annotations which designate locations in a document where a targeted annotation (e.g., set of characters or words) is located in the document may require direct human interaction to generate bounding boxes for annotation text.

This disclosure describes a new approach to provide alignment of character recognition tokens with weakly annotated tabular data (e.g., data tables comprising cells populated by annotations that lack bounding boxes indicating a location of the text of the annotation in the document). The disclosed technologies enable bounding boxes for tabular data annotations to be generated around character recognition tokens matching the annotations without relying upon human annotations indicating the location of the bounding boxes. For example, in accordance with the disclosed technologies, a new annotation alignment service with tabular data matching is provided for generating such bounding boxes for tabular data using character recognition token outputs and weak annotations. The disclosed technologies may provide strong annotations for use in a variety of applications, such as training models, generative models, output prediction checkers, and/or other applications that utilize annotations relating to recognized characters in documents that include tabular data.

Example System

Figure 1:
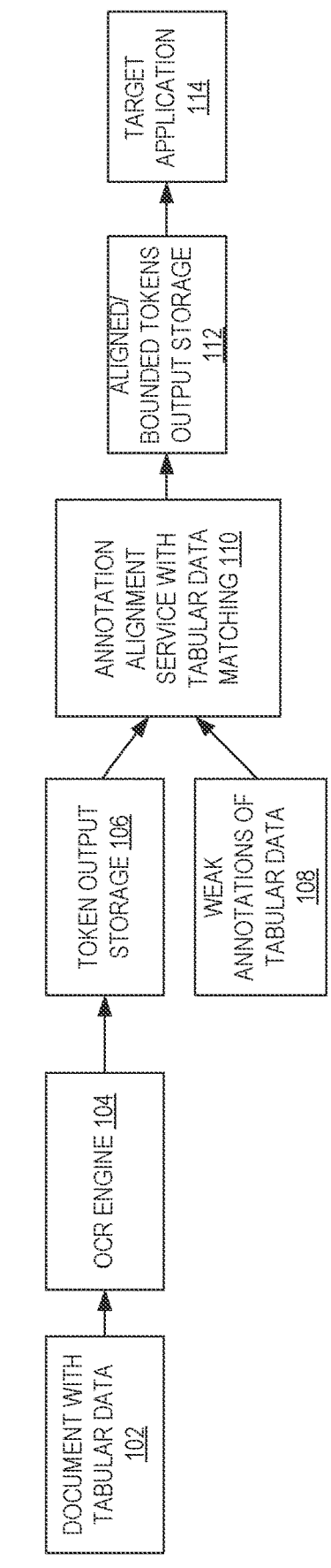
FIG. 1 is a block diagram of an example system for aligning optical character recognition (OCR) tokens representing tabular data with weak annotations to generate strong annotations in accordance with examples of the present disclosure.

FIG. 1 shows an example block diagram of a system 100 for aligning tabular data annotations with character recognition token outputs (e.g., to generate strong annotations from weak annotations) in accordance with examples of the present disclosure. In some examples, a document 102 comprising tabular data (e.g., a digital computer file including recognizable text) is input to an optical character recognition (OCR) engine 104. It is to be understood that the OCR engine 104 may include any suitable character recognition systems (e.g., computing systems configured to execute instructions and/or otherwise perform the operations described herein) and/or algorithms, including intelligent character recognition (ICR).

The OCR engine 104 may be configured to perform one or more pre-processing operations to condition the data of the document for character recognition, including but not limited to analyzing the document to classify areas as including text (e.g., based on colors in the document, such as classifying light areas as non-text and dark areas as including text), enhancing clarity/image quality by performing one or more image processing operations (e.g., skewing/de-skewing, smoothing, artifact removal, etc. The OCR engine 104 may then execute one or more character recognition algorithms by analyzing the pre-processed document, including performing pattern matching and/or feature recognition to identify characters in the document. In some examples, the OCR engine 104 may perform post-processing operations including generating output relating to the results of the character recognition. The output of OCR engine 104 can include OCR tokens as well as bounding box coordinates for each OCR token. The bounding box coordinates for a given OCR token can include, for example, (x,y) coordinate pairs for each corner of the bounding box which indicate where on the document the bounding box corner is located. As shown in FIG. 1, the OCR engine 104 may output OCR tokens and associated bounding box coordinates to a token output storage 106.

In some examples, the output of OCR engine 104 includes a tabular data representation. The tabular data representation can include, for example, insertion of additional characters (e.g., a | character) between each OCR token or group of OCR tokens representing data in a cell of a data table in the document 102. In other examples, however, the OCR output does not include any tabular data representations, and instead includes the text of each cell of the data table one after another. The disclosed technologies can be applied to any of these examples as long as the (x,y) coordinate pairs for the OCR token bounding boxes are included in the OCR engine output.

The token output storage 106 may include a memory or storage device configured to store OCR tokens indicating recognized characters generated by the OCR engine 104 based on the content of the document 102, along with bounding box coordinates for the tokens and any tabular data output by the OCR engine. The tokens may include words (e.g., where the term "word" is used herein in at least some examples to refer to a group of one or more characters including numbers, symbols, letters, etc.) that are included in the document 102, where the tokens are ordered and/or have an indication of a position in the document relative to lines of the document and/or other words in the document.

As shown at 108, weak annotations for tabular data may be provided to indicate content of the document 102. For example, if the document is known to include tabular data such as a data table, the text of that data table may be provided as a weak annotation for the document. However, as described above, the weak annotation may not include any bounding boxes or other indication of a location (e.g., coordinates) of the corresponding text in the document. The weak annotations 108 may include words, similarly to the OCR tokens. An example of a weak annotation is described in more detail below with respect to FIG. 2. Weak annotations 108 may be provided from a weak annotation source, such as a LLM configured to generate predictions of annotations. Additionally or alternatively, weak annotations 108 may be provided by a user (e.g., via manual input), an automated or semi-automated annotation service (e.g., a database including information of the content of a document), and/or other sources.

An annotation alignment service with tabular data matching 110 is included in the system 100 to intelligently match words of the weak annotations of tabular data with the OCR tokens to identify where in the document 102 the text of the weak annotations is located. As a result, aligned and/or bounded tokens may be generated and stored at 112. The aligned and/or bounded tokens may include a representation of the aligned text of the weak annotations 108 and a bounding box having coordinates associated with a location of the OCR tokens determined to be aligned with the weak annotations 108, thus converting the weak annotations into corresponding strong annotations without human intervention to manually generate the bounding boxes. The aligned/bounded tokens in storage 112 may be provided to a target application 114 for further processing involving the document 102. For example, the target application 114 may include a machine learning model configured to accept strong annotations for documents to train the model. In other examples, the target application 114 may include an application that uses a generative model configured to generate weak annotations and/or predictions for documents to display predictions to a user (e.g., the weak annotations 108 may be provided by the generative model and the aligned/bounded tokens output storage 112 may include bounding boxes to be used by the application to enhance the output of the generative model), In still further examples, the target application 114 may include one or more language models and the output stored at 112 may be used to check output prediction of the language models.

Figure 2:
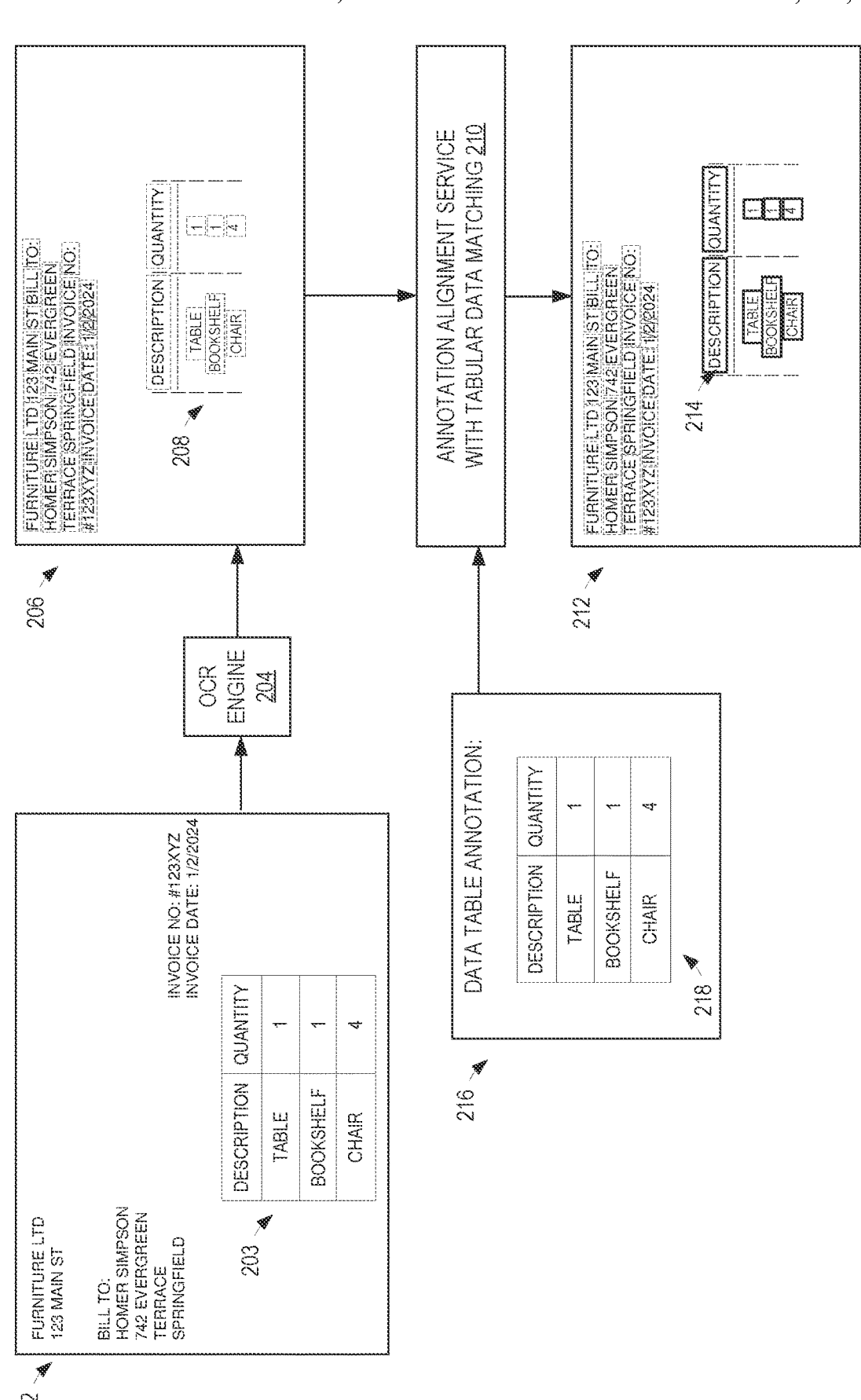
FIG. 2 is an example application of annotation alignment with tabular data matching for a document comprising a data table.

FIG. 2 schematically shows how different components of an annotation alignment system, such as system 100 of FIG. 1, may be used to convert weak annotations of tabular data to strong annotations for a document. As shown, a document 202 may be input into an OCR engine 204 (e.g., an example of OCR engine 104 of FIG. 1). The document 202 includes several different pieces of information, including a company name and address, a bill recipient name and address, and invoice number, and invoice data, and a data table 203. The OCR engine 204 may be configured to process the document 202 and attempt to recognize the text content in the data table therein (e.g., using the algorithms and/or operations described above with respect to OCR engine 104 of FIG. 1). An example output of the OCR engine is shown at 206, including a plurality of tokens 208 corresponding to recognized words in the document.

In the depicted example, the OCR engine outputs a rudimentary table arrangement in which the columns of the data table (labeled with header fields "DESCRIPTION" and "QUANTITY") are separated by the "|" character, and other characters are inserted to represent a line between the header fields and the rows below. In other examples, the OCR engine output may just be the OCR tokens and bounding box coordinates, and may not include any such attempt at representation of a data table.

The output 206 of the OCR engine 204 and a weak annotation 216 (e.g., a data table annotation 218 including two columns and three rows) are provided to an annotation alignment service with tabular data matching 210 for processing. Annotation alignment service with tabular data matching 210 may be an example of annotation alignment service with tabular data matching 110 of FIG. 1 and may be configured to perform one or more of the associated operations. For example, the annotation alignment service with tabular data matching 210 may be configured to match words in cells of the data table annotation 218 (e.g., "DESCRIPTION," "QUANTITY," "TABLE," "1," etc.) with one or more respective OCR tokens from the output 206 and determine a best match using a cost function, which will be described in more detail below. As a result, the annotation alignment service with tabular data matching 210 may generate a bounding box around the OCR tokens that are matched to the data table annotation 218 such as bounding box 214, and provide an output 212 including the generated bounding box(es).

Example Method—Aligning Tokens with Weakly Annotated Tabular Data

FIG. 3 is a flowchart of an example method 300 for aligning weakly annotated tabular data with character recognition tokens in accordance with one or more examples of the present disclosure. For example, method 300 may be performed by one or more components of a system, such as a system 100 of FIG. 1. In some examples, method 300 may be performed by executing instructions of an annotation alignment service with tabular data matching and/or other components described above with respect to FIGS. 1 and 2.

At 302, the method includes receiving, from a character recognition engine, tokens identifying recognized words in a document and bounding box coordinates for each token. For example, as described above with respect to FIGS. 1 and 2, an OCR engine can output OCR tokens for words identified by the character recognition algorithms and processing. The OCR engine can also output bounding box coordinates for each OCR token. The document can include tabular data (e.g., one or more data tables).

At 304, the method includes receiving, from an annotation source, a data table comprising annotations to be aligned with the tokens. The annotations can be considered weak annotations as they lack bounding boxes. The data table can include a plurality of columns and a plurality of rows which intersect to define cells. The top row of the data table can include respective header annotations for each column, whereas the contents of the second row, third row, and so on may be referred to as line items (i.e., one line item per row). Each line item can include an annotation in one or more (e.g., all) of the cells of the row which has a value. The value of each annotation can include one or more characters (e.g., alphanumeric characters and/or special characters), and/or one or more words.

At 306, the annotations of the data table are grouped by column and value to produce a plurality of annotation groups. When referring to a given annotation group, the header field value can be used to denote the column associated with the annotation group (i.e., the column in which the annotations of the group are arranged). For example, referring to the data table annotation 218 of FIG. 2, grouping the annotations by column and value produces the following annotation groups: {(DESCRIPTION, TABLE)}; {(DESCRIPTION, BOOKSHELF)}; {(DESCRIPTION, CHAIR)}; {(QUANTITY, 1), (QUANTITY, 1)}; and {(QUANTITY, 4)}. In this instance, the annotation group for the annotations in the "QUANTITY" column with a value of 1 contains two annotations. As described herein, in such examples, a search algorithm may be performed exactly once for each unique column-value pair when aligning tabular data with character recognition tokens, as opposed to performing the search algorithm once for each of the annotations in the group.

Next, a stepwise process 308 is performed for each of the annotation groups. In particular, each of the actions that make up stepwise process 308 is performed in the depicted sequence for each of the annotation groups produced at 306. While the depicted example describes producing a plurality of annotation groups 306, it is also possible that the data table could include a single annotation group (e.g., if it only includes one column). Stepwise process 308 includes, for each of the annotation groups, performing a search algorithm at 310 to identify a plurality of candidate alignments and associated heuristic scores for the annotation group, each candidate alignment comprising one or more of the tokens. As described herein, the search algorithm can include a beam search algorithm, such as a best-first beam search algorithm, which calculates respective heuristic scores for the plurality of candidate alignments for each annotation (e.g., for each cell of the data table). Each candidate alignment can include one or more character recognition tokens (e.g., OCR tokens). For example, the character recognition engine that extracts the tokens from the document may include a rudimentary representation of a data table present in the document, in which the contents of each cell of the data table are separated by a character. In such examples, the search algorithm groups the tokens together, such that cells containing multiple tokens can be matched to annotations of the data table in the manner described herein.

The heuristic score for a given candidate alignment can be based at least in part on a cost indicating a strength of the alignment, which can be based on a comparison of the annotation to the one or more tokens that make up the candidate alignment. The cost of a given candidate alignment (and thus, the heuristic score of the alignment) can in turn be based at least in part on a factor indicating a string similarity between the corresponding annotation and the respective token(s) of the candidate alignment. For example, each character of the annotation word that is different than the token(s) in the candidate alignment can increase the cost by a set amount (e.g., a flat cost, such as 1 point increase for each different character, an accelerating cost such that each additional character difference increases the cost by a further amount, etc.) or a variable amount (e.g., by an amount that is based on a pixel/shape/contextual difference between the different characters, for example a character difference of I vs J would be assigned a lower cost than a difference of O vs Z). As a non-limiting example, the string similarity may be a Levenshtein distance (e.g., the minimum number of single-character edits (insertions, deletions, or substitutions) required to change one word into the other). A lower cost can result in a higher heuristic score for a given candidate alignment, and vice versa.

The heuristic score of each candidate alignment can also be based on other factors without departing from the scope of this disclosure. For example, for annotations made up of multiple words, the search algorithm can take into account a distance cost when determining the heuristic score of a given candidate alignment. In particular, the search algorithm can first align the first word of the multi-word annotation to a token based on the string cost metric, and then the search algorithm can be performed again for the next word of the multi-word annotation based on a distance cost metric in addition to the string cost metric, and so on for any remaining words of the multi-word annotation. In such instances, the distance cost can be a function of a distance (e.g., Euclidean distance) of a token to the prior word of the multi-word annotation that was aligned.

Continuing with stepwise process 308, it includes selecting from among the plurality of candidate alignments, at 312, the n candidate alignments with the highest heuristic scores, where n is the number of annotations in the annotation group. For example, in an annotation group with two repeated column-value pairs such as {(QUANTITY, 1), (QUANTITY, 1)}, the two candidate alignments with the highest heuristic scores would be selected at 312.

As described further herein, in some examples, the selection process may differ for the annotation groups in the base column versus the annotation groups in other columns of the data table. In such examples, the column having the highest mean character count can be designated as the base column. Alternatively, other metrics can be used as a basis for the base column designation (e.g., highest median character count). After the stepwise process 308 has been performed for the annotation groups in the base column, a vertical range of the base column can be determined (e.g., calculated) based on the coordinates of the annotation bounding boxes generated for the annotations in the base column. For example, the vertical range can include a minimum value corresponding to the smallest y-coordinate of the annotation bounding boxes generated for the annotations in the base column and a maximum value corresponding to the largest y-coordinate of the annotation bounding boxes generated for the annotations in the base column. Optionally, a buffer can be added to the vertical range to add some leeway (e.g., the range can be expanded by a predetermined amount), During subsequent iterations of the stepwise process 308 for the annotation groups in the other columns of the data table (i.e., the columns other than the base column), the n candidate alignments for each annotation group can be selected from among a subset of the plurality of candidate alignments which falls within the vertical range. Such operation can advantageously prevent matching of data table annotations to tokens that were not part of the corresponding data table in the document from which the tokens were extracted.

In some examples, the plurality of candidate alignments identified at 310 may include a subset of candidate alignments with a same heuristic score and a same y-coordinate of the bounding box(es) of the token(s). In such examples, additional steps may be performed during the selection step to determine which of the subset of candidate alignments should be selected. For example, the candidate alignment whose token(s) have the smallest bounding box height may be selected from among the subset of candidate alignments as one of the n candidate alignments. Selecting the candidate alignment with the smaller bounding box height may advantageously reduce a common error in which a bounding box surrounds tokens in multiple rows.

At 314, the stepwise process 308 optionally includes matching each annotation in the annotation group with one of the selected candidate alignments based on an order in which the annotations are arranged in the data table and further based on the bounding box coordinates of the token(s) of the selected candidate alignments. This step is optional as it is only relevant when an annotation group has multiple entries (e.g., due to the same value being present two or more times in a single column). In some examples, the order in which the annotations are arranged in the data table can be received from the annotation source, e.g., in the form of an ordered annotation list in which the annotations are arranged in the order they appear in the data table. The bounding box coordinates of the token(s) of the selected candidate alignments can be used to generate an ordered candidate list of the selected candidate alignments, e.g., by sorting the selected candidate alignments in descending order based on their bounding box coordinates. The two ordered lists can then be compared to match the annotations with the candidate alignments. This can include matching the annotations one-by-one in the order they appear in the ordered annotation list to the selected candidate alignments in the order they appear in the ordered candidate list. Accordingly, the order in which the annotations appear in the data table, which is typically known, can be exploited to improve the accuracy of the matching process.

In some examples, the stepwise process 308 is also performed for annotations that represent headers of the data table columns (e.g., "DESCRIPTION" and "QUANTITY" annotations in the example shown in FIG. 2. In such examples, the stepwise process can include, for each annotation representing a header field, performing a search algorithm to identify a plurality of candidate alignments and associated heuristic scores for the annotation, each candidate alignment comprising one or more of the tokens. Next, the stepwise process can include determining that the plurality of candidate alignments comprises a subset of candidate alignments with a same heuristic score. The stepwise process for the header annotations can further include selecting, from among the subset of candidate alignments, the candidate alignment whose token(s) have bounding box(es) with higher y-coordinate values. Such operation can avoid incorrect mapping of header field annotations to OCR tokens in line items of a data table in situations where the header field has the same value as one of the cells in the corresponding column, as the correct OCR token(s) for the header should have higher bounding box y-coordinate values due to the way data tables are structured.

After performing the stepwise process 308 for each of the annotation groups, the method proceeds to 316. At 316, the method includes generating, for each match identified via the stepwise process, an annotation bounding box having coordinates associated with a location of the corresponding tokens(s) in the document. For example, the bounding box may be selected to be the smallest box that encloses the one or more tokens matched with the annotation. While the examples herein describe using coordinates to specify the location of the annotation bounding box, another means of specifying the location of the annotation bounding box may alternatively be used without departing from the scope of this disclosure.

At 318, the method includes outputting an indication of the coordinates of the annotation in the document. In some examples, the indication can be output to a target application. The indication can include, for example, x and y coordinate information for the annotation bounding boxes, which can be used by target application to strongly annotate the document. The strongly annotated document can then be incorporated in a training corpus of an MLM. Via incorporation of such documents in the training corpus, the MLM can be trained to correctly match OCR tokens in scanned documents to corresponding annotations.

For example, the document can be an invoice containing a data table with line items having columns such as "DESCRIPTION" and "QUANTITY." The techniques described herein can be used to quickly generate accurate bounding boxes for annotations within the data tables of numerous such documents without human intervention, which in turn can be used to train an MLM of a target application. The target application can subsequently receive scanned invoices containing similar information to be ingested by the application. Having been trained with strong annotations for similar invoices, the MLM can extract data from the scanned invoices and correctly map it to appropriate fields.

Additional examples of target applications and uses of the annotations (now converted to a strong annotations) are described above.

Example Process for Aligning Data Table Annotations to OCR Tokens

Figure 4:
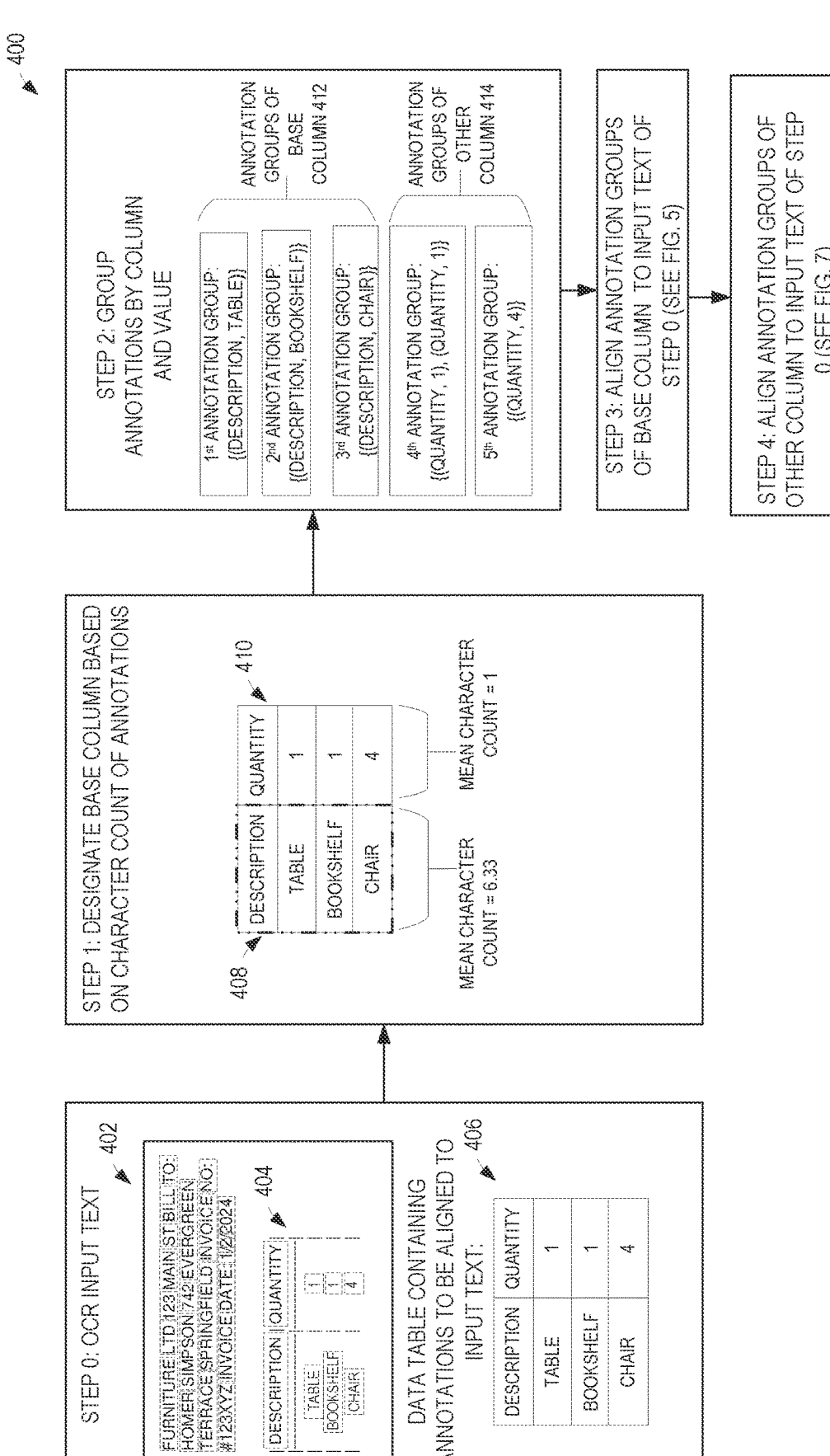
FIG. 4 is a schematic representation of an example process for aligning data table annotations to OCR tokens in accordance with examples of the present disclosure.

FIG. 4 schematically shows an example process 400 for aligning data table annotations to OCR tokens. For example, the process 400 may be performed by the annotation alignment service with tabular data matching 110 of FIG. 1 or annotation alignment service with tabular data matching 210 of FIG. 2 to generate an alignment of OCR tokens to weak annotations contained in cells of a data table.

At step 0, OCR input text (e.g., OCR tokens) extracted from a document is shown at 402. Similar to the OCR engine output 206 of FIG. 2, the OCR input text 402 includes tokens representing a company name and address, a bill recipient name and address, and invoice number, and invoice data. OCR input text 402 further includes tokens 404 that were part of a data table in the original document from which the tokens were extracted. In the depicted example, the OCR engine output includes a makeshift representation of the data table, in which the contents of each cell are separated by the "|" character and the row containing the header fields is separated from the subsequent rows containing the line items by a line of dashes. In other examples, however, the OCR engine may simply output the annotations of the data table one after another (similar to the non-data table tokens such as "FURNITURE", "LTD", etc.).

In the depicted example, each cell of the data table in the original document from which the OCR tokens were extracted contained a single OCR token. In other examples, however, one or more of the cells of the data table may include multiple tokens. Additionally or alternatively, one or more of the cells of the data table may be unpopulated (e.g., containing no data and thus no tokens).

A data table containing annotations to be aligned to the input text is shown at 406, which corresponds to the example data table annotation 218 of FIG. 2. While a simple data table is shown for the sake of example, a more complex data table could alternatively be used (e.g., a data table with numerous rows and columns and/or with lengthier cell contents such as cells with multiple words). The annotations in data table 406 are considered weak annotations as they do not have bounding boxes.

At step 1, a base column is designated among the columns of the data table. As described herein, designation of the base column can include calculating a mean (e.g., average) character count of the annotations in each column and selecting the column whose annotations have the highest mean character count as the base column. Alternatively, a median character count or other metric can be used to designate the base column. In the depicted example, the annotations in the "DESCRIPTION" column (not including the header field) have a mean character count of 6.33, whereas the annotations in the "QUANTITY" column (not including the header field) have a mean character count of 1. Accordingly, as shown, the "DESCRIPTION" column is designated as the base column 408. Optionally, in an example where the mean character count for multiple columns is equal, the left-most column among the multiple columns can be designated as the base column. The "QUANTITY" column is then considered an "other" column 410 of the data table (i.e., a non-base column). In other examples, the data can include another number of other columns.

Certain advantages can be achieved by designating a base column and then finding the bounding boxes for the annotations in the base column first. For example, as the values in the base column are less likely to be duplicated elsewhere in the document relative to the values in the other columns (because they contain many characters), it can be advantageous to first find the bounding boxes for the base column annotations and then use the coordinates of those bounding boxes as an approximation (e.g., estimate) of the vertical range of the data table. Then, during the alignment process for the annotations in the other columns of the data table, the tokens selected for alignment can be limited to those which fall within the vertical range to avoid alignment with tokens outside of the data table.

At step 2, the annotations in the data table are grouped by column and value to create a plurality of annotation groups. In the depicted example, the grouping produces first, second, and third annotation groups containing annotations arranged in the designated base column (annotation groups of base column 412) as well as fourth and fifth annotation groups containing annotations arranged in the other column (annotation groups of other column 414). While the first, second, third, and fifth annotation groups each include a single column-value pair, the fourth annotation group includes two column-value pairs (representing the repeated "1" value in the "QUANTITY" column). As described herein, during the alignment process, a search algorithm can be performed only once (i.e., a single time) for each annotation group even when the annotation group contains multiple repeated column-value pairs. Such operation can advantageously reduce processing overhead, as performing the search algorithm for a repeated value will produce the same output again.

Figure 5:
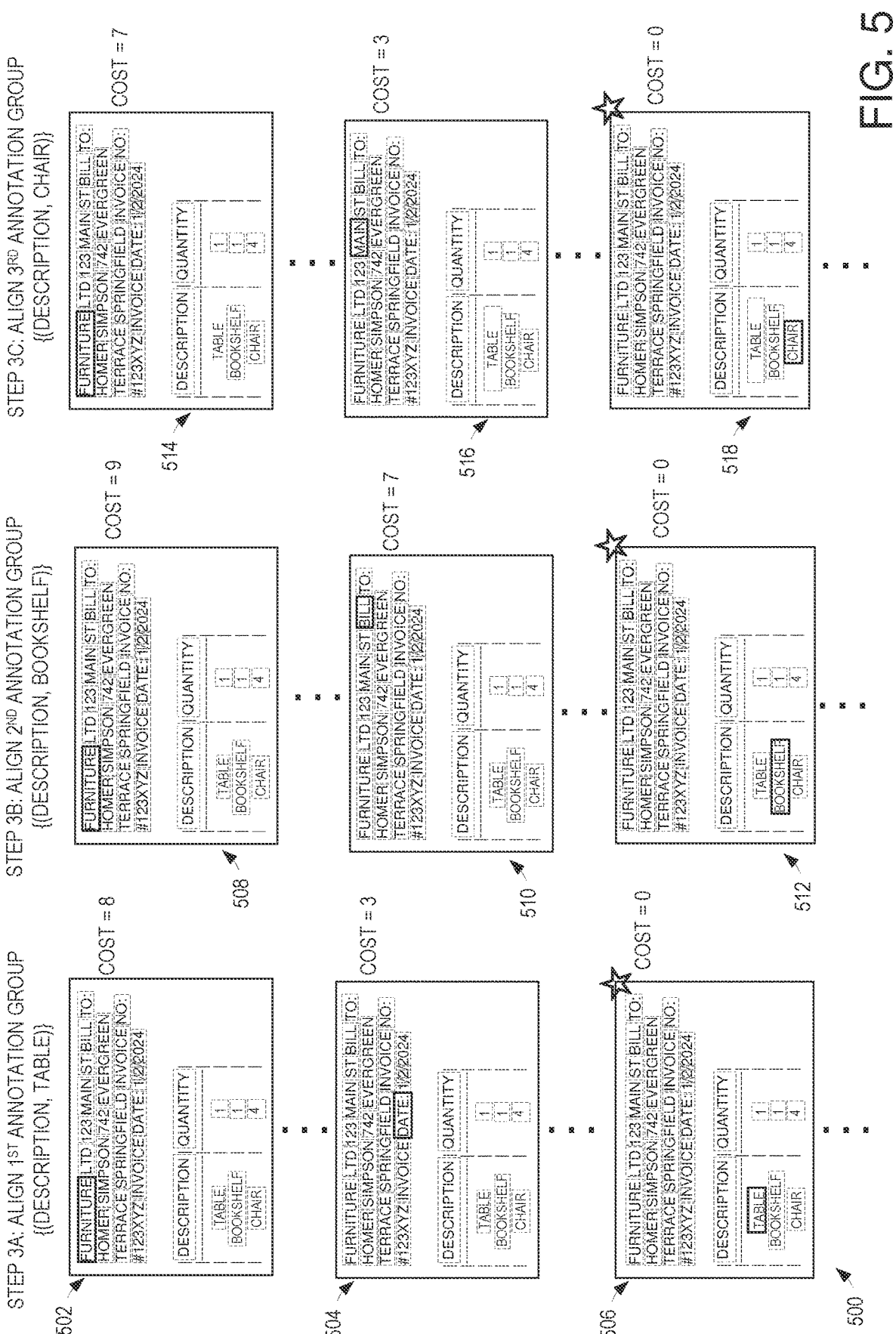
FIG. 5 is a schematic representation of an example process for aligning annotations in a base column of a data table with OCR tokens in accordance with examples of the present disclosure.
Figure 7:
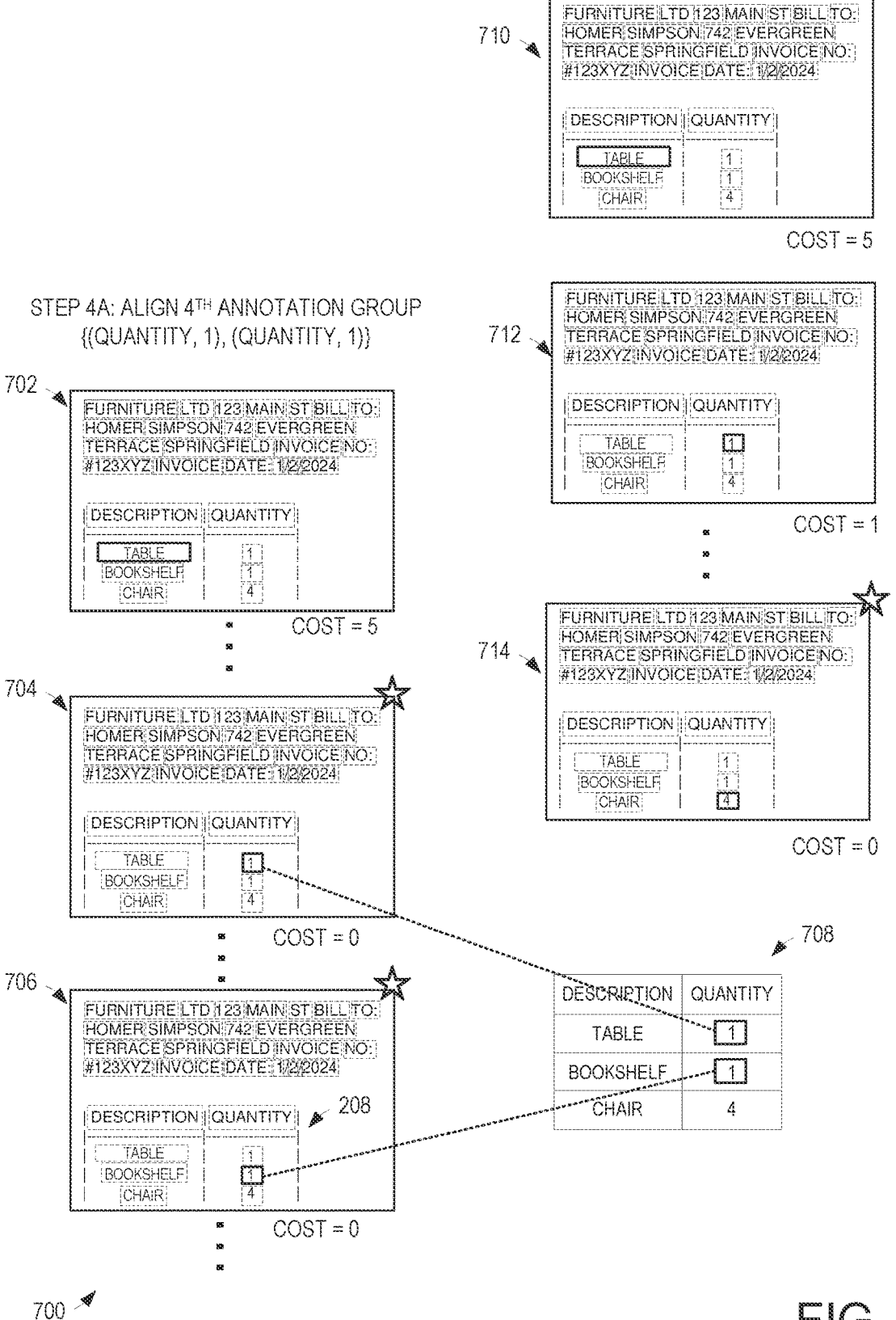
FIG. 7 is a schematic representation of aligning annotations in non-base columns of a data table with OCR tokens in accordance with examples of the present disclosure.

At step 3, the annotation groups of the base column 412 are aligned to the input text of step 0. An example of this process is depicted in FIG. 5. Next, at step 4, the annotation groups of the other column 414 are aligned to the input text of step 0. An example of this process is depicted in FIG. 7. In examples where the data table includes multiple other columns, the annotation groups of all the other columns would be aligned at step 4. As described herein, performing the alignment of the annotation groups of the other column(s) after performing the alignment of the annotation groups of the base column can advantageously be influenced by the results of the base column alignment. In particular, the coordinates of the bounding boxes generated for the annotations in the base column can be used to infer a vertical range of the data table, and the results of the alignment of the annotations in the other column(s) can be limited to only consider (e.g., allow) tokens within the vertical range of the data table.

Example Process for Aligning Base Column Annotations to OCR Tokens

FIG. 5 schematically shows an example process 500 for aligning base column annotations to OCR tokens. For example, the process 500 may be performed by the annotation alignment service with tabular data matching 110 of FIG. 1 or annotation alignment service with tabular data matching 210 of FIG. 2. As indicated, process 500 can be performed at step 3 of process 400 of FIG. 4.

At step 3A, the first annotation group of the base column (in particular, the first annotation group shown in FIG. 4 at step 2) is aligned to the input text shown in FIG. 4 at step 0. Towards this end, a search algorithm, such as a best-first beam search algorithm, can be executed by an annotation alignment service with tabular data matching. The best-first beam search algorithm can identify, from among the OCR tokens in the input text, a plurality of candidate alignments and associated heuristic scores for the first annotation group which contains a single instance of the column-value pair (DESCRIPTION, TABLE). In practice, the search algorithm can include several stages (e.g., a first set of candidate alignments are identified, and then a specified number of the candidate alignments with the highest heuristic scores are expanded to produce a second set of candidate alignments, and so on). For the sake of brevity, however, a single stage with a single set of candidate alignments is shown for each annotation group alignment in FIGS. 5 and 7.

Three example candidate alignments 502, 504, and 506 are shown for the first annotation group. Candidate alignment 502 maps the annotation "TABLE" to the OCR token "FURNITURE" which is not part of the data table in the original document. As shown, the cost of this alignment is 8, which represents the string cost. The string cost may include factors that relate to a difference between the characters in the selected OCR token and the characters of the annotation to which the OCR token is being aligned. In the depicted example, the Levenshtein edit distance is used as the string cost, which indicates how many edit operations are needed to change the current OCR word into the annotation word. Other approaches can also be used to calculate the string cost, and/or other costs, associated with a particular candidate alignment. The cost of a given candidate alignment can be inversely proportional to the heuristic score for the candidate alignment (e.g., a lower cost can result in a higher heuristic score, whereas a higher cost can result in a lower heuristic score).

As indicated by the ellipsis mark between candidate alignments 502 and 504, the search algorithm may identify other candidate alignments after identifying candidate alignment 502 and before identifying candidate alignment 504. For example, the search algorithm may identify a candidate alignment for each OCR token, in the depicted order (e.g., a candidate alignment for token "LTD" would be identified after candidate alignment 502, and so forth). Similarly, the other ellipses marks depicted in FIGS. 5 and 7 represent candidate alignments that would be identified between the depicted candidate alignments which are not shown for the sake of brevity. Depending on the search algorithm used and the associated parameters, all OCR tokens in the input text may be aligned with a given annotation, or alternatively, only a subset of the OCR tokens in the input text may be aligned with the annotation.

Candidate alignment 504 maps the annotation "TABLE" to the OCR token "DATE" which is also not part of the data table in the original document. As shown, the string cost of this alignment is 3. After identifying candidate alignments for several other OCR tokens, the search algorithm goes on to identify candidate alignment 506, which maps the annotation "TABLE" to the OCR token "TABLE" (i.e., the correct corresponding token). The string cost of this alignment is 0 as the values have matching strings. The search algorithm then goes on to identify candidate alignments for the remaining tokens.

After identifying the appropriate number of candidate alignments and associated heuristic scores for the annotation group, the n candidate alignments with the highest heuristic scores (and thus, the lowest costs) can be selected, where n is the number of annotations in the annotation group. In the depicted example, the first annotation group includes only one annotation, and thus a single candidate alignment with the highest heuristic score is selected. As indicated by the star, candidate alignment 506 is selected as it has the lowest cost and thus the highest heuristic score.

A similar process is performed at step 3B for the second annotation group of the base column which contains a single instance of the column-value pair (DESCRIPTION, TABLE). Candidate alignments 508, 510, and 512 are identified, of which candidate alignment 512 has the lowest cost and thus the highest heuristic score (as indicated by the star). Accordingly, candidate alignment 512 is selected.

A similar process is also performed at step 3C for the third annotation group of the base column which contains a single instance of the column-value pair (DESCRIPTION, CHAIR). Candidate alignments 514, 516, and 518 are identified, of which candidate alignment 518 has the lowest cost and thus the highest heuristic score (as indicated by the star). Accordingly, candidate alignment 518 is selected.

As each of the base column annotation groups only includes a single annotation in this example (typical for base columns, which are often "DESCRIPTION" columns), the matching step described at step 314 of FIG. 3 is not relevant. Accordingly, the selected candidate alignments 506, 512, and 518 can be considered "matches" for the respective single annotations of the first, second, and third annotation groups. As described herein, for each match, an annotation bounding box can be generated which has coordinates that are associated with a location of the corresponding token(s) in the document. For example, the x and y coordinates of the annotation bounding box are selected such that the annotation bounding box would encapsulate the contents of the token, or tokens for a multi-token candidate alignment, if it were present in the document from which the tokens were extracted. In particular, for a single-token candidate alignment, the x and y coordinates of the corresponding annotation bounding box would be similar to, if not the same as, the x and y coordinates of the original token of the candidate alignment; for a multi-token candidate alignment, the x and y coordinates of the corresponding annotation bounding box would be similar to the x and y coordinates of the original tokens combined together. These annotation bounding boxes can then be used to determine a vertical range of the data table, which in turn can be used to limit the candidate alignments selected for annotation groups in other columns of the data table.

Example Method—Determining Vertical Range of Data Table

FIG. 6 is a flowchart of an example method 600 for determining a vertical range of a data table based on base column annotation alignments in accordance with examples of the present disclosure. For example, method 600 may be performed by one or more components of a system, such as a system 100 of FIG. 1. In some examples, method 600 may be performed by executing instructions of an annotation alignment service with tabular data matching and/or other components described above with respect to FIGS. 1 and 2. As described herein, method 600 can be performed after bounding boxes have been generated for the annotations in the base column of a data table annotation. Accordingly, with reference to FIG. 3, method 600 can be performed after the stepwise process 308 and the step 316 have been performed for the annotation groups in the base column, but before the stepwise process 308 has been performed for the annotation groups in the other column(s) of the data table.

At 602, coordinates of annotation bounding boxes for the annotations in the base column are obtained. At 604, a vertical range of the data table is determined based on the coordinates obtained at 602. As shown, this can include selecting the minimum and maximum y-coordinates from among the coordinates for the annotation bounding boxes for the base column annotations at 606, and designating the selected minimum and maximum y-coordinates as the minimum and maximum y-coordinates of the vertical range at 608.

Optionally, if desired, the minimum y-coordinate of the vertical range designated at 608 can be decreased by a predetermined amount, and/or the maximum y-coordinate of the vertical range designated at 608 can be increased by a predetermined amount at 610. This optional step can be performed to add a buffer to the bottom and/or top of the vertical range.

At 612, during subsequent alignment of annotation groups in other columns of the data, only candidate alignments whose token(s) have bounding box coordinates within the vertical range of the base column may be allowed. In this way, mapping of annotations to tokens outside the data table can be avoided. Occasionally, the vertical range restriction may be too stringent and result in no candidate alignments being found during subsequent alignment processes for other column(s) of the data table. To account for this situation, the method optionally includes a step in which the vertical range restriction is removed. Accordingly, responsive to no candidate alignments being found during the subsequent alignment of an annotation group of one of the other column(s) of the data table, the alignment can be repeated for that annotation group without the vertical range restriction in option step 614.

Example Process for Aligning Other Column Annotations to OCR Tokens

FIG. 7 schematically shows an example process 700 for aligning other column annotations to OCR tokens. For example, the process 700 may be performed by the annotation alignment service with tabular data matching 110 of FIG. 1 or annotation alignment service with tabular data matching 210 of FIG. 2. As indicated, process 700 can be performed at step 4 of FIG. 4, and after steps 604-610 of FIG. 6 have been performed. In addition, process 700 can be thought of as encompassing step 612 and optional step 614 of FIG. 6, in that those steps can be performed during the alignment process for the other column annotations.

At step 4A, the fourth annotation group of the other column (in particular, the fourth annotation group shown in FIG. 4 at step 2) is aligned to the input text shown in FIG. 4 at step 0. As described above with reference to FIG. 5, a search algorithm such as a best-first beam search algorithm can be executed by an annotation alignment service with tabular data matching to perform the alignment. The best-first beam search algorithm can identify, from among the OCR tokens in the input text, a plurality of candidate alignments and associated heuristic scores for the fourth annotation group. In the example, the fourth annotation group contains two instances of the column-value pair (QUANTITY, 1). However, the search algorithm is executed only once for this column-value pair (rather than twice, once for each instance of the column-value pair in the fourth annotation group).

Three example candidate alignments 702, 704, and 706 are shown for the fourth annotation group. In the example, only candidate alignments within a vertical range determined based on the annotation bounding boxes for the base column annotations are eligible for selection. Accordingly, an incorrect mapping of the annotation "1" to the OCR token "1" in the which is part of the invoice date listed in the document is avoided.

As shown, candidate alignment 702 maps the annotation "1" to the OCR token "TABLE"; the cost of this alignment is 5, which represents the string cost. Candidate alignment 704 maps the annotation "1" to the first OCR token "1" within the vertical range. As shown, the string cost of this alignment is 0 as the annotation's string exactly matches that of the OCR token. For similar reasons, candidate alignment 706, which maps the annotation "1" to the second OCR token "1" within the vertical range, also has a string cost of 0.

As the fourth annotation group includes two annotations, the two candidate alignments with the highest heuristic scores are selected in step 4A (i.e., candidate alignments 704 and 706 which each have a cost of 0). As described herein with reference to step 314 of FIG. 3, the two annotations and in the fourth annotation group can be matched with the selected candidate alignments 704 and 706 based on an order in which the annotations are arranged in the data table and the bounding box coordinates of the tokens of the selected candidate alignments. This can include matching the annotations one-by-one in the order they appear in the data table to the selected candidate alignments 704 and 706 based on the bounding box coordinates of the associated tokens. Accordingly, as shown at 708, the first "1" annotation that appears in the data table containing the annotations can be matched with the OCR token "1" in the first line item of the data table of the document, and the second annotation "1" that appears in the data table containing the annotations can be matched with the OCR token "1" in the second line item of the data table of the document. A similar process can be carried out in examples where the annotation group includes more than two repeated column-value pairs, and/or in examples where an annotation is matched with multiple OCR tokens (e.g., when a cell of the data table has cells containing multiple words or character strings).

At step 4B, the fifth annotation group of the other column, which contains a single instance of the column-value pair (QUANTITY, 4), is aligned. Candidate alignments 710, 712, and 714 are identified, of which candidate alignment 714 has the lowest cost and thus the highest heuristic score (as indicated by the star). Accordingly, candidate alignment 714 is selected. As the fifth annotation group only includes a single annotation in this example, the matching step described at step 314 of FIG. 3 is not relevant. Accordingly, the selected candidate alignment 714 can be considered a match for the single annotation of the fifth annotation group.

As described herein, an annotation bounding box can then be generated for each of the matches determined in steps 4A and 4B, and each annotation box can have coordinates associated with a location of the corresponding token(s) in the document. An indication of the coordinates of the annotation bounding boxes in the document can be output by the annotation alignment service with tabular data matching, e.g., to a target application such as an MLM configured to accept strong annotations for documents for training.

Example Search Algorithms

The search algorithms described herein can be beam search algorithms, such as a best-first beam search algorithm. Alternatively, the search algorithms can be another type of search algorithm that provides, as output, multiple best candidates for alignment (rather than a single best candidate).

In examples where a beam search algorithm is used, a beam size for the search can be specified. The beam size can dictate the number of states selected for expansion in each stage of the search. The beam size can be any integer greater than 1, and can be selected by a user, set by default (e.g., based on a number of annotation words/tokens, a targeted precision, etc.), and/or selected by another process(es).

For example, when a beam search algorithm with a beam size of two is executed in the context of the technologies described herein, the alignments with the best two heuristic scores are selected for expansion at each of multiple stages of the search. Thus, the beam search algorithm explores multiple states at each step, and expands the states, selecting the best k (in this example, k=2) states for the next step, doing so iteratively until obtaining a target amount or number of terminal states. In some examples, an agenda is used to store all the states that will be expanded, which initially only includes the initial state where no annotation word is aligned yet. At each step, each state in the agenda is expanded by aligning the current annotation to one or more OCR tokens that have not been aligned, and the overall cost so far is calculated, which is the overall cost of the previous state plus the incremental cost. Having gathered all the new states in a step, the states are then ranked by the cost, and the top-k ones are selected into the agenda for the next step. The process of expand→select can be performed Z times until reaching the terminal state with the minimal cost, where Z is the number of words in the annotation, since at each step one word of the annotation is aligned.

To reduce the search space, in some examples, a heuristic is applied that not all OCR tokens are to be considered after the previous alignment (and/or after each step of alignment). For example, only the OCR tokens that are within the following x lines (e.g., where x=3 in a non-limiting example) of the last OCR token may be considered since the aligned OCR tokens are unlikely to be farther away from each other. In this way, a speed of the beam search algorithm may be increased by reducing the total number of alignments/steps performed while focusing on best (e.g., most likely and/or lowest cost) candidates for alignment.

Further Implementation Examples

In some examples, the scoring/cost function described above may consider other metrics. For example, if it is known that an annotation is found near another annotation in the document, then a Euclidean distance to that other annotation may be a factor in the cost function. In other examples, selection of OCR tokens for aligning to an annotation may be performed using a knowledge of a template/layout of the document, such that OCR tokens in a vicinity of a target region of the document associated with non-tabular data (e.g., address fields are typically in an upper left or upper right of the document, etc.) are scored lower (e.g., have a higher cost) than OCR tokens outside of the target region (or otherwise as a function of distance to the target region). Accordingly, in some examples, a cost may be based, at least in part, on a distance of a token to a target annotation or region in the document.

In some examples, a distance between OCR tokens may be precomputed or, once computed while performing a beam search algorithm, the distance may be stored/cached to avoid recalculating it in future executions. Similar caching/precomputing may be performed for string similarities in order to provide even further computing resource cost/time delay reductions.

Example Advantages

This solution is superior in comparison of approaches in the past with regards to at least the following considerations. The disclosed approach addresses errors that arise when attempting to align repeated values in a column of a data table, which were not addressed in prior approaches. In addition, the disclosed approach prevents errors in which an annotation within a data table is aligned with a token in the document which is not part of a data table. Generally, the solution described herein increases the accuracy of obtaining strong annotations from character recognition processes, and expands applicability of weakly annotated data by automatically generating such strong annotations (e.g., bounding boxes) for such weak annotations of tabular data without human annotation efforts.

A Generalized Computer Environment

Figure 8:
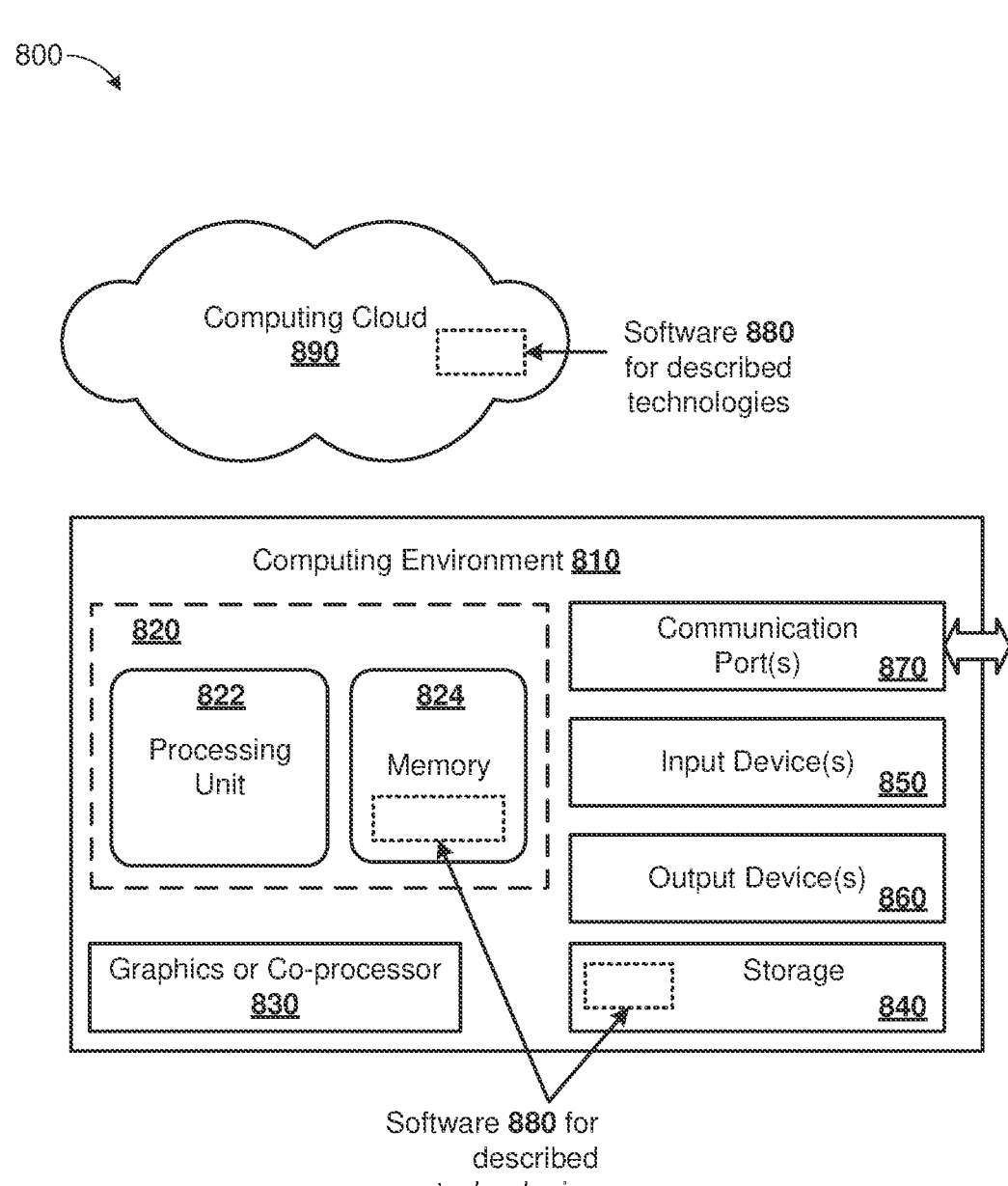
FIG. 8 is a diagram schematically depicting a computing environment suitable for implementation of disclosed technologies.

FIG. 8 illustrates a generalized example of a suitable computing system 800 in which described examples, techniques, and technologies, including performing search algorithms to align tabular data to character recognition tokens according to disclosed technologies can be implemented. For example, the computing system 800 and/or one or more elements of the computing system 800 may include and/or be included within the described components of system 100 of FIG. 1 and/or be used to perform operations described in correspondence to FIGS. 2-7. The computing system 800 is not intended to suggest any limitation as to scope of use or functionality of the present disclosure, as the innovations can be implemented in diverse general-purpose or special-purpose computing systems.

With reference to FIG. 8, computing environment 810 includes one or more processing units 822 and memory 824. In FIG. 8, this basic configuration 820 is included within a dashed line. Processing unit 822 executes computer-executable instructions, such as for implementing any of the methods or objects described herein for performing alignment of tabular data to character recognition tokens, or various other architectures, components, handlers, managers, modules, or services described herein. Processing unit 822 can be a general-purpose central processing unit (CPU), a processor in an application-specific integrated circuit (ASIC), or any other type of processor. In a multi-processing system, multiple processing units execute computer-executable instructions to increase processing power. Computing environment 810 can also include a graphics processing unit or co-processing unit 830. Tangible memory 824 can be volatile memory (e.g., registers, cache, or RAM), non-volatile memory (e.g., ROM, EEPROM, or flash memory), or some combination thereof, accessible by processing units 822, 830. The memory 824 stores software 880 implementing one or more innovations described herein, in the form of computer-executable instructions suitable for execution by the processing unit(s) 822, 830. The memory 824 can also store footprint calculation data, a composite graph data structure, including nodes, edges, and their respective attributes; a table or other data structure indicating states of a modeled system, configuration data, UI displays, browser code, data structures including data tables, working tables, change logs, output structures, input fields, output fields, data values, indices, or flags, as well as other operational data.

A computing environment 810 can have additional features, such as one or more of storage 840, input devices 850, output devices 860, or communication ports 870. An interconnection mechanism (not shown) such as a bus, controller, or network interconnects the components of the computing environment 810. Typically, operating system software (not shown) provides an operating environment for other software executing in the computing environment 810, and coordinates activities of the components of the computing environment 810.

The tangible storage 840 can be removable or non-removable, and includes magnetic disks, magnetic tapes or cassettes, CD-ROMs, DVDs, or any other medium which can be used to store information in a non-transitory way and which can be accessed within the computing environment 810. The storage 840 stores instructions for the software 880 (including instructions and/or data) implementing one or more innovations described herein.

The input device(s) 850 can be a mechanical, touch-sensing, or proximity-sensing input device such as a keyboard, mouse, pen, touchscreen, trackball, a voice input device, a scanning device, or another device that provides input to the computing environment 810. The output device(s) 860 can be a display, printer, speaker, optical disk writer, or another device that provides output from the computing environment 810.

The communication port(s) 870 enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 800 can also include a computing cloud 890 in which instructions implementing all or a portion of the disclosed technology are executed. Any combination of memory 824, storage 840, and computing cloud 890 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, software objects, classes, components, data structures, etc. that perform tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in a hardware processor or another form of physical computer hardware, and thus include both software associated with virtualization and underlying hardware.

Example Cloud Computing Environment

FIG. 9 depicts an example cloud computing environment 900 in which the described technologies can be implemented. For example, the computing environment 900 and/or one or more elements of the computing environment 900 may include and/or be included within the described components of system 100 of FIG. 1 and/or be used to perform operations described in correspondence to FIGS. 2-7. The cloud computing environment 900 comprises a computing cloud 990 containing resources and providing services. The computing cloud 990 can comprise various types of cloud computing resources, such as computer servers, data storage repositories, networking resources, and so forth. The computing cloud 990 can be centrally located (e.g., provided by a data center of a business or organization) or distributed (e.g., provided by various computing resources located at different locations, such as different data centers and/or located in different cities or countries).

The computing cloud 990 can be operatively connected to various types of computing devices (e.g., client computing devices), such as computing devices 912, 914, and 916, and can provide a range of computing services thereto. One or more of computing devices 912, 914, and 916 can be computers (e.g., servers, virtual machines, embedded systems, desktop, or laptop computers), mobile devices (e.g., tablet computers, smartphones, or wearable appliances), or other types of computing devices. Communication links between computing cloud 990 and computing devices 912, 914, and 916 can be over wired, wireless, or optical links, or any combination thereof, and can be short-lived or long-lasting. Communication links can be continuous or sporadic. These communication links can be stationary or can move over time, being implemented over varying paths and having varying attachment points at each end. Computing devices 912, 914, and 916 can also be connected to each other.

Computing devices 912, 914, and 916 can utilize the computing cloud 990 to obtain computing services and perform computing operations (e.g., data processing, data storage, and the like). Particularly, software 980 for performing the described innovative technologies can be resident or executed in the computing cloud 990, in computing devices 912, 914, and 916, or in a distributed combination of cloud and computing devices.

General Considerations

As used in this disclosure, the singular forms "a," "an," and "the" include the plural forms unless the surrounding language clearly dictates otherwise. Additionally, the terms "includes" and "incorporates" mean "comprises." Further, the terms "coupled" or "attached" encompass mechanical, electrical, magnetic, optical, as well as other practical ways of coupling items together, and does not exclude the presence of intermediate elements between the coupled items. Furthermore, as used herein, the terms "or" and "and/or" mean any one item or combination of items in the phrase.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 8, computer-readable storage media include memory 824 and storage 840. The term computer-readable storage media does not include signals and carrier waves. In addition, the term computer-readable storage media does not include communication ports (e.g., 870) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ABAP, Adobe Flash, Angular, C, C++, C#, Curl, Dart, Fortran, Go, Java, JavaScript, Julia, Lisp, Matlab, Octave, Perl, Python, R, Ruby, SAS, SPSS, WebAssembly, any derivatives thereof, or any other suitable programming language, or, in some examples, markup languages such as HTML or XML, or in any combination of suitable languages, libraries, and packages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. One or more non-transitory computer-readable media storing instructions which, when executed by one or more hardware processors, cause the hardware processors to perform actions comprising: receiving, from a character recognition engine, tokens identifying recognized words in a document and bounding box coordinates for each token; receiving, from an annotation source, a data table comprising a plurality of columns and one or more rows, each row comprising a plurality of annotations to be aligned with the tokens; grouping the annotations in the data table by column and value to produce a plurality of annotation groups; in a stepwise process for each of the annotation groups: performing a search algorithm to identify a plurality of candidate alignments and associated heuristic scores for the annotation group, each candidate alignment comprising one or more of the tokens; selecting, from among the plurality of candidate alignments, n candidate alignments with highest heuristic scores for the annotation group, where n is a number of annotations in the annotation group; and matching each annotation in the annotation group with one of the selected candidate alignments based on an order in which the annotations are arranged in the data table and the bounding box coordinates of token(s) of the selected candidate alignments; generating, for each of the matches identified via the stepwise process, an annotation bounding box having coordinates associated with a location of the corresponding token(s) in the document; and outputting an indication of the coordinates of the annotation bounding boxes in the document.

2. The one or more non-transitory computer-readable media of claim 1, wherein the actions further comprise: for each column of the data table, determining a mean character count of the annotations arranged therein; and designating, among the plurality of columns of the data table, the column whose annotations have a highest mean character count as a base column.

3. The one or more non-transitory computer-readable media of claim 2, wherein the actions further comprise: determining a vertical range of the base column based on the bounding box coordinates of the token(s) of the selected candidate alignments matched with the annotations in the base column.

4. The one or more non-transitory computer-readable media of claim 3, wherein for the annotation groups in the columns of the data table other than the base column, the n candidate alignments with the highest heuristic scores are selected from among a subset of the plurality of candidate alignments whose token(s) have bounding box coordinates within the vertical range of the base column, wherein the subset includes one or more of the plurality of candidate alignments.

5. The one or more non-transitory computer-readable media of claim 1, wherein the actions further comprise, in the stepwise process for each of the annotation groups: determining that the plurality of candidate alignments comprises a subset of candidate alignments with a same heuristic score and a same y-coordinate of bounding box(es) of the token(s); and selecting, from among the subset of candidate alignments, the candidate alignment whose token(s) have a smallest bounding box height as one of the n candidate alignments.

6. The one or more non-transitory computer-readable media of claim 1, wherein the actions further comprise: receiving, from the annotation source, an ordered annotation list in which the annotations are arranged in the order they appear in the data table, wherein the matching further comprises, for each annotation group: generating an ordered candidate list of the selected candidate alignments by sorting the selected candidate alignments in descending order based on their bounding box coordinates; and matching the annotations one-by-one in the order they appear in the ordered annotation list to the selected candidate alignments in the order they appear in the ordered candidate list.

7. The one or more non-transitory computer-readable media of claim 1, wherein the actions further comprise: identifying, in the data table, annotations representing header fields; and in a stepwise process for each of the annotations representing the header fields: performing a search algorithm to identify a plurality of candidate alignments and associated heuristic scores for the annotation, each candidate alignment comprising one or more of the tokens; determining that the plurality of candidate alignments comprises a subset of candidate alignments with a same heuristic score; and selecting, from among the subset of candidate alignments, the candidate alignment whose token(s) have bounding box(es) with higher y-coordinate values.

8. The one or more non-transitory computer-readable media of claim 1, wherein the search algorithm includes a best-first beam search algorithm.

9. The one or more non-transitory computer-readable media of claim 1, wherein the indication of the coordinates of the annotation bounding boxes in the document is output to a target application comprising a machine learning model configured to accept strong annotations for documents to train the model.

10. A method performed by a computer, the method comprising:
receiving, from a character recognition engine, tokens identifying recognized words in a document and bounding box coordinates for each token;
receiving, from an annotation source, a data table comprising a plurality of columns and one or more rows, each row comprising a plurality of annotations to be aligned with the tokens;
for each column of the data table, determining a mean character count of the annotations arranged therein;
designating, among the plurality of columns of the data table, the column whose annotations have a highest mean character count as a base column;
grouping the annotations in the data table by column and value to produce a plurality of annotation groups;
in a first stepwise process for each of the annotation groups in the base column:
performing a search algorithm to identify a plurality of candidate alignments and associated heuristic scores for the annotation group, each candidate alignment comprising one or more of the tokens;
selecting, from among the plurality of candidate alignments, n candidate alignments with highest heuristic scores for the annotation group, where n is a number of annotations in the annotation group; and
matching each annotation in the annotation group with one of the selected candidate alignments based on an order in which the annotations are arranged in the data table and the bounding box coordinates of token(s) of the selected candidate alignments;
determining a vertical range of the base column based on the bounding box coordinates of the token(s) of the selected candidate alignments matched with the annotations in the base column;
in a second stepwise process for each of the annotation groups in the columns of the data table other than the base column:
performing a search algorithm to identify a plurality of candidate alignments and associated heuristic scores for the annotation group, each candidate alignment comprising one or more of the tokens;
selecting, from among the plurality of candidate alignments, n candidate alignments with highest heuristic scores for the annotation group whose token(s) have bounding box coordinates within the vertical range of the base column, where n is a number of annotations in the annotation group; and
matching each annotation in the annotation group with one of the selected candidate alignments based on the order in which the annotations are arranged in the data table and the bounding box coordinates of the token(s) of the selected candidate alignments; and
for each of the matches identified via the first and second stepwise processes, generating an annotation bounding box having coordinates associated with a location of the corresponding token(s) in the document.

11. The method of claim 10, further comprising, in each of the first and second stepwise processes:
determining that the plurality of candidate alignments comprises a subset of candidate alignments with a same heuristic score and a same y-coordinate of bounding box(es) of the token(s); and selecting, from among the subset of candidate alignments, the candidate alignment whose token(s) have a smallest bounding box height as one of the n candidate alignments.

12. The method of claim 10, further comprising:

receiving, from the annotation source, an ordered annotation list in which the annotations are arranged in the order they appear in the data table, wherein, in each of the first and second stepwise processes, the matching further comprises, for each annotation group:

generating an ordered candidate list of the selected candidate alignments by sorting the selected candidate alignments in descending order based on their bounding box coordinates; and matching the annotations one-by-one in the order they appear in the ordered annotation list to the selected candidate alignments in the order they appear in the ordered candidate list.

13. The method of claim 10, further comprising:

identifying, in the data table, annotations representing header fields; and in a third stepwise process for each of the annotations representing the header fields:

performing a search algorithm to identify a plurality of candidate alignments and associated heuristic scores for the annotation, each candidate alignment comprising one or more of the tokens;

determining that the plurality of candidate alignments comprises a subset of candidate alignments with a same heuristic score; and selecting, from among the subset of candidate alignments, the candidate alignment whose token(s) have bounding box(es) with higher y-coordinate values.

14. The method of claim 10, further comprising:

outputting an indication of the coordinates of the annotation bounding boxes in the document to a target application.

15. The method of claim 14, wherein the target application comprises a machine learning model configured to accept strong annotations for documents to train the model.

16. The method of claim 10, wherein the search algorithm comprises a best-first beam search algorithm.

17. A system, comprising:

one or more hardware processors with memory coupled thereto;

non-transitory computer-readable media storing instructions executable by the one or more hardware processors, the instructions comprising:

instructions to receive, from a character recognition engine, tokens identifying recognized words in a document and bounding box coordinates for each token;

instructions to receive, from an annotation source, a data table comprising a plurality of columns and one or more rows, the plurality of columns comprising a base column and one or more other columns, and each row comprising a plurality of annotations to be aligned with the tokens;

instructions to group the annotations in the data table by column and value to produce a plurality of annotation groups;

instructions to perform, in a first stepwise process for each of the annotation groups in the base column, a search algorithm to match each annotation in the annotation group with one or more of the tokens;

instructions to generate, for each of the matches identified via the first stepwise process, an annotation bounding box having coordinates associated with a location of corresponding token(s) in the document;

instructions to determine a vertical range of the base column based on the bounding box coordinates of the token(s) matched with the annotations in the base column;

instructions to perform, in a second stepwise process for the annotation groups in the one or more other columns, the search algorithm to match each annotation in the annotation group with one or more of the tokens, wherein the search algorithm only considers tokens for matching whose bounding box coordinates are within the vertical range of the base column; and instructions to generate, for each of the matches identified via the first and second stepwise processes, an annotation bounding box having coordinates associated with a location of the corresponding token(s) in the document.

18. The system of claim 17, wherein the annotations in the base column have a higher mean character count than the annotations in each of the one or more other columns.

19. The system of claim 17, wherein the search algorithm includes a best-first beam search algorithm.

20. The system of claim 17, wherein the instructions further comprise:

instructions to output an indication of the coordinates of the annotations in the document to a machine learning model configured to accept strong annotations for documents to train the model.

* * * * *